Patented May 5, 1953

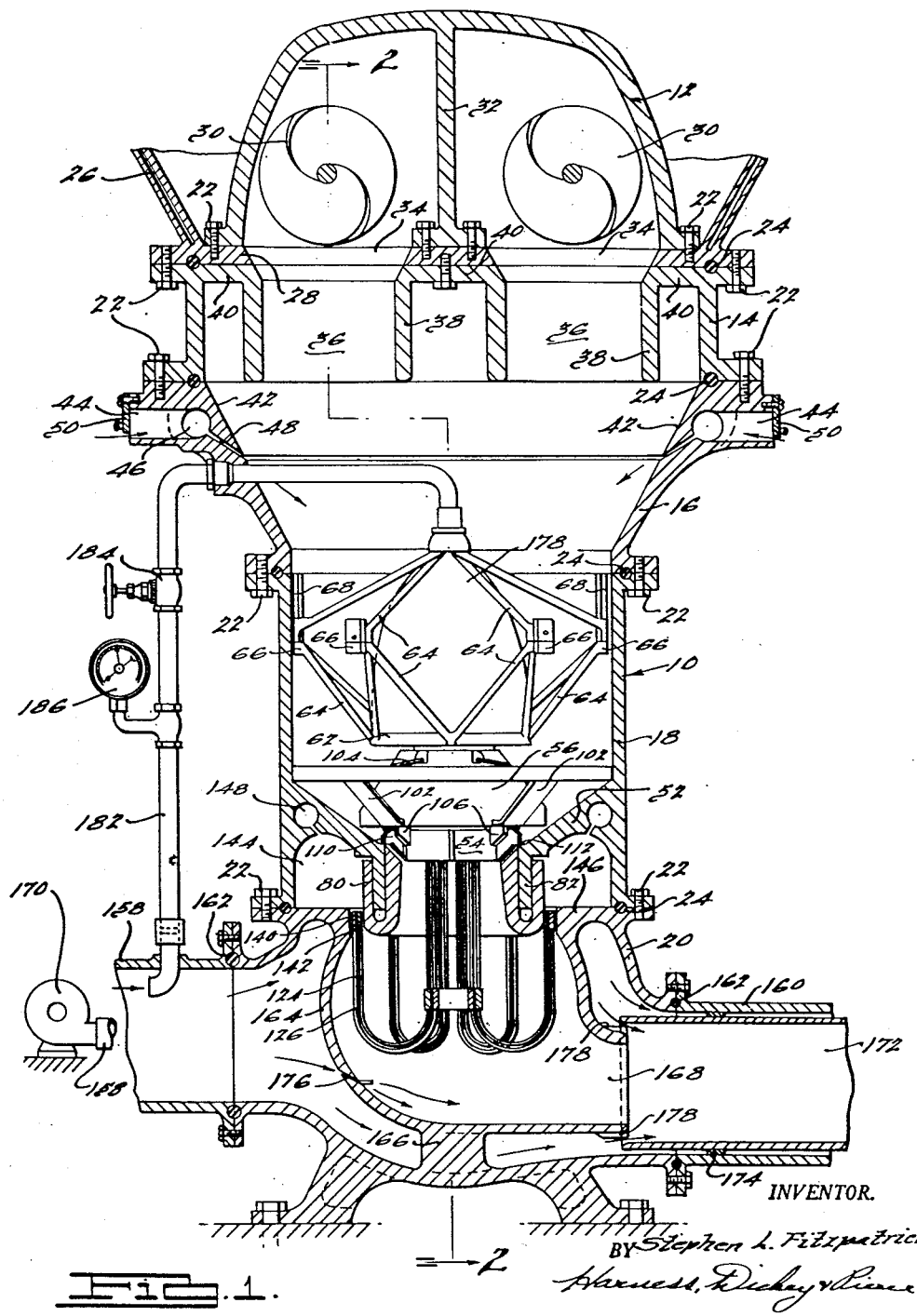

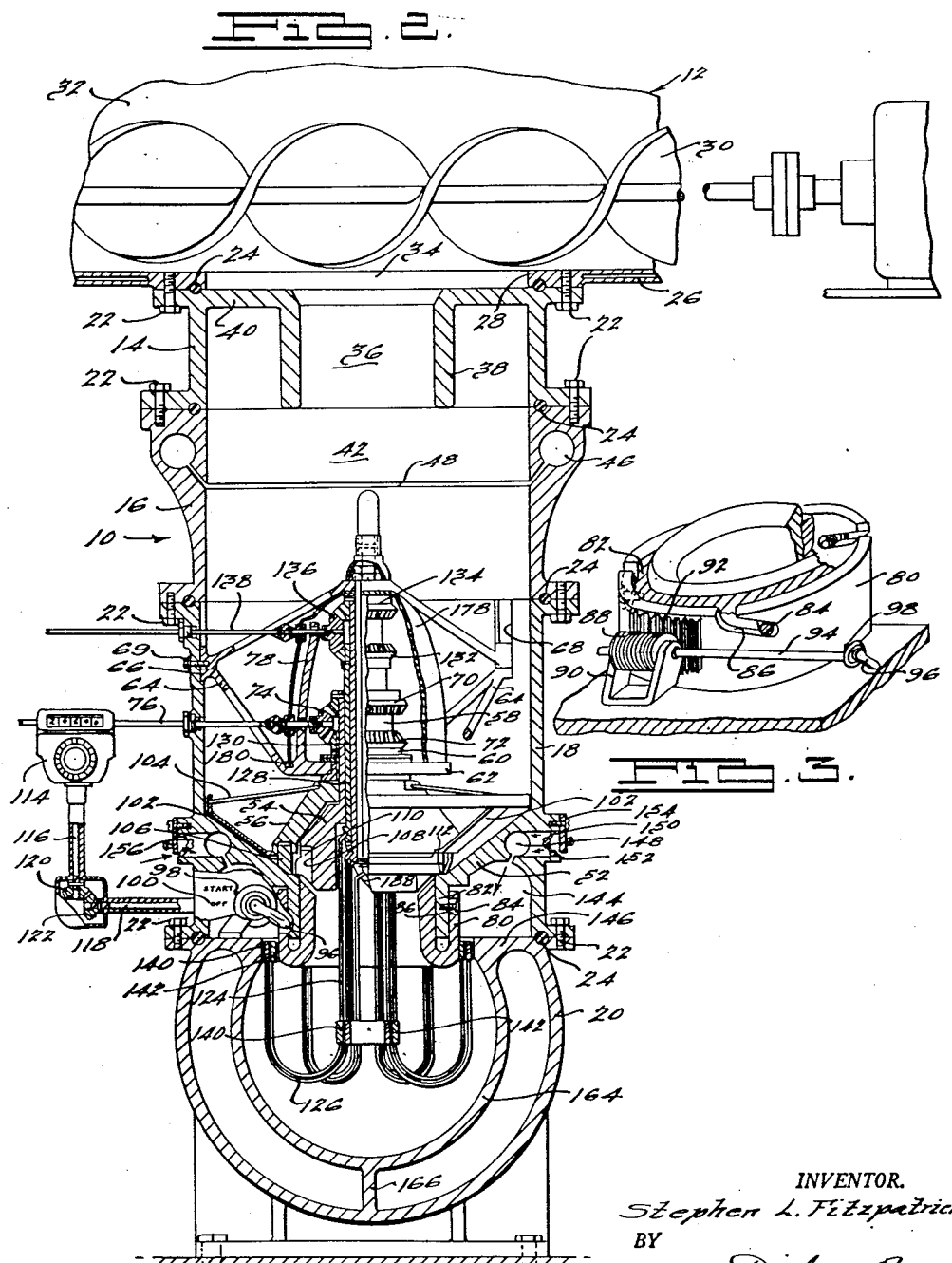

2,637,599

UNITED STATES PATENT OFFICE 2,637,599

CARBURETOR FOR POWDERED FUEL

Stephen L. Fitzpatrick, Detroit, Mich., assignor to Blokolgas System, Inc., Detroit, Mich., a corporation of Michigan Application November 24, 1947, Serial No. 787,765

13 Claims. (Cl. 302—56)

This invention relates broadly to new and useful improvements in furnaces for burning powdered coal and more particularly to a novel carburetor for regulating the flow of fuel to the furnace.

In the combustion of solid fuels, certain basic conditions must prevail if the action is to be perfect. In the first place, the fuel and air must be supplied in proper proportion; second, the fuel and air must be uniformly and thoroughly mixed and brought into intimate contact in all parts of the zone of combustion; third, there must be sufficient surface contact between the fuel and the air; fourth, the temperature must be such that the combustion is active and complete; and fifth, sufficient time must be allowed for complete combustion. Fulfilling the last two requirements, i. e., sufficient temperature for active combustion and enough time for complete combustion, usually is not a critical problem in present day industrial power plant furnaces. The questions of efficiency and perfect burning are more dependent on how well the fuel and the system for burning it fulfills the first three requirements; namely, proper porportion of fuel and air, thorough and uniform mixture of the fuel and air, and sufficient surface contact.

In general, powdered coal is the only solid fuel which fulfills the requirements for perfect combustion. When properly mixed with air it will flow and burn like a liquid fuel, and the fuel and air can be supplied in proper proportions at all times. Thus, powdered coal is much cleaner and more efficient to burn than lump coal. In the case of stoker or hand-fired furnaces, the continual and unpredictable choking-off of the draft here and there in the fuel bed makes control of the air-fuel ratio impossible. The tiny particles of powdered coal can be thoroughly mixed with and uniformly spread through the air so that each particle is in intimate contact with the air at all times. This is contrasted with the burning of fuel in lumps where the air flow varies from one part of the fire bed to the other and different parts of the coal are continually being shut off from the air. Also, in the case of powdered coal, the extremely large number of small particles are surrounded with air; and, as a result, the aggregate surface exposure to the air is several hundred times greater than an equivalent amount of coal in a stoker fed or hand-fired furnace.

Heretofore, it has not been practicable to use powdered coal in domestic heating plants or in similar small scale applications. In view of the cleanliness, safety and economy of powdered coal, engineers have tried to build small furnaces that would perform as well and as efficiently as the large industrial furnaces but they have been unsuccessful. One of the main problems in adapting small furnaces for powdered coal, is to properly blend the fuel and air and to feed the fuel uniformly and at a controlled rate to the combustion chamber.

In typical large furnaces using pulverized coal, the fuel is fed directly from a pulverizer to a feeder and thence into a forced stream of air which carries it into the combustion chamber. Additional air may be injected into the combustion chamber if necessary or desirable to assure proper combustion. In practice, the load on the pulverizer varies as coal of different size goes through. This factor necessarily causes a slight variation in the output of the pulverizer and consequently in the rate at which the coal is supplied to the feeder. Since the typical feeder does not positively control the flow of fuel, the feeding of fuel to the combustion chamber is not always uniform.

Substantially complete combustion can be obtained in industrial furnaces even though the fuel is not fed at a uniform rate and is not thoroughly and properly mixed with air before it is injected into the combustion chamber. The large size of the combustion chamber and the relatively long travel afforded thereby before the fuel passes into the stack permits additional mixing of the fuel and air inside the chamber and to some extent overcomes the effects of uneven feed and bad distribution of the fuel and air. However, in the case of small furnaces, it is necessary that the fuel and air be blended properly before entering the combustion chamber, the fuel must be uniformly distributed through the current of air which carries it to the combustion chamber, and the fuel-air mixture must be fed to the chamber at an absolutely uniform rate in order to assure proper and efficient combustion.

An important object of the present invention is to provide a carburetor which is primarily adapted and pre-eminently suited for small furnaces.

Another object of the invention is to provide a carburetor which will automatically blend powdered coal or other fuel with the proper amount of air before the fuel is injected into the combustion chamber.

Still another object of the invention is to provide a carburetor which will assure a uniform distribution of the fuel in the fuel-air mixture.

Yet another object of the invention is to provide a carburetor which will supply the fuel-air mixture at an absolutely uniform rate to the combustion chamber.

A still further object of the invention is to provide a carburetor which is adjustable to vary the rate of flow of the fuel to the combustion chamber.

A still further object of the invention is to provide a carburetor of the above mentioned character which is uniquely constructed to prevent the powdered fuel from settling on bearings and other moving parts as it passes through the carburetor.

Other objects and advantages of the invention will be apparent during the course of the following description.

In the drawing forming a part of this specification and wherein like numerals are employed to designate like parts throughout the same:

Fig. 1 is a vertical, sectional view through a carburetor embodying the invention;

Fig. 2 is a vertical, sectional view taken on the line 2—2 of Fig. 1; and

Fig. 3 is a fragmentary, perspective view of the valve which controls the flow of fuel through the carburetor.

The carburetor here shown has an upright generally tubular housing 10 which is made up of superposed sections 12, 14, 16, 18, and 20. The various sections of the housing 10 are fastened securely together by bolts 22, and suitable annular sealing elements 24 are provided between the several sections.

In the form of the invention here shown by way of illustration, the housing 10 is carried by a suitable supporting structure 26, as perhaps best shown in Fig. 1. Support 26 is formed with an annular flange 28 which is interposed between the two housing sections 12 and 14 and is fastened thereto by screws 22 in the manner hereinabove described. It is to be understood, of course, that the support 26 may be a part of any suitable structure required to position the carburetor properly in the fuel supply system of the furnace.

Powdered fuel is delivered from a pulverizer or the like to the upper housing section 12 in any suitable manner as by means of the two laterally spaced horizontal screw conveyers 30. A vertical partition 32 in the housing section 12 separates the two conveyers 30 so that each operates and functions independently of the other.

Fuel moved into the housing 10 by conveyers 30 falls downwardly by gravity through openings 34 in the supporting annular flange 28 and registering vertical passages 36 in the subjacent housing section 14. In this connection, it will be observed that section 14 is generally circular in plan and that the passages 36 are defined by vertical collars 38 which are connected to the main body of the section by integral web portions 40.

The adjacent section 16 of the housing 10 has downwardly convergent inner surfaces 42 which direct the fuel into the generally cylindrical upper portion of section 18. Also, atmospheric air is drawn into the housing at this point through inlet ports 44. In this connection, it will be observed that section 16 is formed adjacent the upper edge thereof with an annular passage 46, and that the ports 44 extend radially between the passage and the periphery of the section. A continuous annular slot 48 extends downwardly and inwardly from the passage 46 and opens through the inner surface 42. While two inlet ports 44 are here shown, it will be readily appreciated that any suitable number of ports may be provided. Each port 44 preferably is provided with a pivoted damper or flap 50 which can be adjusted to regulate the size of the opening and consequently the amount of air drawn into the housing. Also, attention is directed to the fact that the annular slot 48 extends downwardly and inwardly from the passage 46 so that air enters the housing at a corresponding angle and sweeps along the inner surface 42 to blend with and carry the fuel downwardly through the housing. Air is drawn into the housing 10 by suction created by a forced current of air directed transversely through the lower portion thereof in a manner hereinafter described in detail.

The section 18 which receives the aerated fuel mixture contains a valve for regulating the flow of fuel through the housing and agitators for breaking up or separating any particles which tend to cling together as the fuel passes through the valve. In this connection, it will be observed that the lower portion of section 18 is formed with a downwardly convergent annular flange 52, and mounted concentrically within the section above flange 52 are oppositely rotatable inner and outer agitator members 54 and 56. Agitators 54 and 56 have upwardly extending hub portions 58 and 60 and the inner hub portion 58 extends through and above the outer hub portion 60 as perhaps best shown in Fig. 2. Both hub portions 58 and 60 extend through a generally disk-shaped supporting member 62 which is held centrally within the housing by suitable radial arms 64. In the form of the invention here shown by way of illustration, the inner ends of arms 64 are formed integrally on the support 62, and the outer ends thereof carry brackets 66 which fit in vertical grooves 68 provided in the inner surface of the housing section 18. Cap screws 69 extend radially inwardly through the section 18 and are threaded into the brackets 66 to hold the latter normally fixed in the housing. Bevel gears 70 and 72 fixed on the terminal portions of hubs 58 and 60 mesh with a bevel gear 74 which is fixed on and rotates with a horizontal shaft 76. Shaft 76 is journaled in a vertical arm 78 which is formed integrally on the support 62 and in a suitable bearing provided in the housing section 18. It will be readily apparent that rotation of gear 74 rotatably drives gears 70 and 72 and the agitator members 54 and 56 carried thereby in opposite directions.

The inner agitator member 54 cooperates with a U-shaped, annular valve 80 to control downward passage of fuel through the carburetor housing 10. In this connection, it will be observed that the flange 52 is formed centrally thereof with a depending annular skirt 82 and that the valve 80 fits upwardly over the skirt. When fully raised, the inner annular flange portion of valve 80 seats against the under surface of member 54 to shut off flow of fuel through the carburetor. However, when the valve 80 is lowered an annular opening is formed between it and the agitator 54 through which the fuel passes.

The valve 80 is supported by a plurality of studs 84 which extend radially outwardly from the skirt 82 through inclined slots 86 in the outer flange of the valve. A worm 88 carried by a suitable supporting bracket 90 on the lower carburetor section 20 meshes with a gear segment 92 on the outer flange of valve 80. The shaft 94 which carries worm 88, projects from the housing 10, and the projecting portion thereof carries a handle 96. When handle 96 is manually rotated, the worm gear 88 moves the gear segment 92 angularly about the axis of valve 80. Movement of the valve 80 in this manner causes pins 84 to move in slots 86. Valve 80 is lowered by rotating the same in a counterclockwise direction and is raised by rotating it in a clockwise direction, as viewed in Fig. 3. Preferably, the handle 96 is formed with a pointer 98 which cooperates with suitable legends or indicia on the housing to register different adjusted positions of the valve.

In order to prevent the fuel from piling up or accumulating on flange 52, the outer agitator member 56 is provided with a plurality of angularly spaced, radially extending arms 102 which sweep the top surface of the flange and scrape the fuel downwardly toward the valve opening. In the form of the invention here shown, the inner ends of arms 102 are integrally or otherwise fixed on the member 56 and the outer ends thereof are rigidly supported by suitable tie rods 104 which are carried by and extend radially from the member. Also, the agitator member 56 is provided with a plurality of radial fins 106, which fins are disposed behind and extend downwardly from the arms 102 to rest on the flange 52. Thus, the fins 106 actually scrape against the flange 52, whereas the arms 102 are spaced slightly therefrom.

The inner agitator member 54 is formed with a circumferential groove or recess 108 which extends through the lower edge thereof and receives a plurality of radially extending fins 110, which fins function in the same manner and serve the same purpose as the fins 106 hereinabove described. In other words, the fins 110 actually support the inner member 54 on the flange 52 and they scrape along the surface of the flange during rotation of the member 54 to move the fuel through the valve opening.

It is an important feature of this invention that the flange 52 is formed immediately around the central opening defined by skirt 82 with an upwardly facing annular shoulder 112, and it will be noted that at least a portion of fins 106 and 110 scrape along this shoulder. Fuel tends to pile up on the shoulder 112 and is scraped therefrom into the valve opening by fins 106 and 110. Since the fins are rotated constantly at a uniform speed, the fuel is pushed into the valve opening at a constantly uniform rate. In this manner, irregularities in the supply of fuel to the carburetor is compensated and an absolutely uniform rate of fuel feed is assured. In this connection, it will be observed that the interface between agitator 54 and valve 80 which defines the annular valve opening, is inclined inwardly and downwardly so that the fuel scraped from the shoulder 112 passes readily into the lower portion of the housing 10. Also, it should be noted that, when the valve 80 is fully raised, it seats solidly against the agitator 54 behind the fins 110 in such manner that the valve opening is entirely closed.

As suggested, the worm gear control for the valve 80 will not be infinitely variable in ordinary installations but will be positioned at definite points. For example, it is contemplated that the handle 96 be movable through an arc of approximately 90° and that it have four positions. In Fig. 3, these positions are designated by the legends "Off," "Start," "Medium," and "High." Thus, a definite size opening is provided for each position of the valve, and there is a constant flow of fuel per hour for each position. These factors enable a mechanical counter or meter 114 to be used to record the amount of fuel used. As clearly shown in the drawings, the meter 114 is driven at a constant speed by the horizontal shaft 76. Any conventional or standard type of meter can be used which is suitable for this purpose. The meter 114 is calibrated in total pounds of fuel and is set according to the known feed of the valve. Also, in the installation here shown, the meter 114 is equipped with a speed-changing mechanism which is operated by a vertical shaft 116. The latter, in turn, is actuated by handle 96 through shaft 118 and bevel gears 120 and 122. Thus, the gear connection sets the meter 114 for "Off," "Start," "Medium," or "High" whenever the indicator 98 is set for "Off," "Start," "Medium," or "High." For example, with the indicator 98 set at "High," the valve might pass fifty pounds every hour. If the worm 88 is then moved to the "Start" position so that the valve only passed twenty-five pounds of fuel per hour, the connection to the meter changes its speed ratio so that it only records twenty-five pounds being used every hour even though the driving shaft is still turning at the same speed as before.

The agitators for breaking up the fuel as it falls downwardly from the valve opening comprise two sets of U-shaped rods 124 and 126. Each set of rods is arranged in a generally circular pattern and the rods 124 are disposed inside the rods 126 as shown in the drawings. The inner set of rods 124 are fastened at one end thereof to a tubular driving member 128 and the rods 126 are similarly fastened to a tubular driving member 130. Driving member 130 extends axially through the driving member 128 and the latter, in turn, extends axially through agitator member 54, as perhaps best shown in Fig. 2. Bevel gears 132 and 134 fixed on the projecting ends of the tubular driving members 128 and 130 are driven in opposite directions by a bevel gear 136. The latter gear is carried by a shaft 138 which is journaled for rotation in the vertical supporting arm 78 and in the side of the housing 10. Both shafts 76 and 138 are driven slowly in any suitable manner. Speeds from 20 to 60 R. P. M. have been found satisfactory. In order to hold the rods 124 and 126 rigid, they are fastened at the distal ends thereof and at a suitable point intermediate their ends to stiffening rings 140 and 142.

The two agitators 124 and 126 extend downwardly through the valve 80 into the lower housing section 20, and the distal stiffening rings 140 and 142 are positioned relatively snugly but rotatably in an annular space defined by the valve and the section 20. In this connection, it will be noted that the housing section 10 is formed below the flange 52 and around the depending skirt 82 with an annular chamber 144, which chamber is partially closed by an inwardly extending radial flange 146 at the top of section 20. The worm drive for valve 80 is contained in chamber 144 and the supporting bracket 90 is mounted on flange 146. Also, it will be noted that the annular space which receives the stiffening rings 140 and 142 communicates with the chamber 144.

In order to keep the fuel away from the worm drive and to prevent the same from packing around the stiffening rings 140 and 142, atmospheric air is introduced into the chamber 144 from an annular passage 148 which is provided on flange 52 above the chamber. Inlet ports 150 extend radially outwardly from passage 148 and open through the periphery of the housing to admit atmospheric air thereto. An annular slot 152 connects passage 148 with chamber 144 and conducts atmospheric air downwardly from the passage into the chamber. Pivoted flaps 154 regulate the flow of air into the housing, and filters 156 clean the air as it enters. Suction created within the body 10 draws air inwardly through ports 150, which air passes downwardly through chamber 148 and slot 152 and over the distal stiffening rings 140 and 142. The downdraft thus created within the lower portion of the housing 10 prevents the powdered fuel from collecting on the stiffening rings 140 and 142 in the lower section 20 and maintains the distal stiffening rings 140 and 142 relatively clean.

The lower housing section 20 is generally in the shape of a T-connection, and air pipes 158 and 160 are fastened to the end openings thereof. Annular sealing elements 162 provide fluid-tight joints between the pipes 158 and 160 and the housing section 20 (Fig. 1). Within the section 20 is an inner bowl member which is integrally fastened at its upper end to the radial flange 146 and is supported by an integral web 166 but otherwise is spaced and entirely separate from the section. As clearly shown in the drawing, the agitators 124 and 126 extend downwardly into the bowl 164 and the latter is formed with a laterally projecting nozzle 168 which extends in the direction of and is arranged coaxially with respect to the pipe 160.

A fan 170 induces a forced current of air in the pipe 158, and this air flows horizontally through the bottom section 20, around the bowl 164, past the nozzle 168 and into pipe 160. In this connection, it will be observed that pipe 160 is provided with an inner tubular lining 172 which, except for suitable spacers 174, is spaced circumferentially therefrom. The liner 172 extends into the lower housing section 20 and telescopically receives the nozzle 168. It should be noted, however, that the lining 172 is spaced radially from the nozzle 168 so that the forced current of air traversing section 20 flows both into the liner 172 and through the annular space between the liner and pipe 160. Spiral vanes 178 on the nozzle 168 impart a slight vortex action to the air as it enters the liner 172.

As a result of the above construction and arrangement of parts, any particles which tend to cling together as the fuel passes through the relatively restricted valve opening, are separated by the agitators 124 and 126 and the finely divided particles are further blended with atmospheric air which enters the housing through ports 150 in the manner hereinabove described. Also, the disturbance caused by the agitators 124 and 126 assures thorough mixing of the air and fuel and a uniform distribution of the fuel in the bowl 164. The forced draft of air flowing past the nozzle 168 has an atomizing effect which creates a suction in the entire carburetor housing and also sucks the fuel out of the bowl 164. As the fuel and air mixture passes from the nozzle 168 into the liner 172, it is mixed with additional amounts of air, and turbulence of the air maintains the finely divided fuel in suspension and uniformly distributed.

In this connection, attention also is directed to the fact that a horizontal slot 176 is provided in the bowl 164 opposite the nozzle 168. Thus, some of the air from the inlet pipe 158 enters the bowl 164 through slot 176 and sweeps across the bottom of the bowl as indicated by the arrows in Fig. 1. The current of air thus created within the bowl keeps the fuel moving toward the discharge nozzle 168 and prevents the same from accumulating or piling up on the floor of the bowl. This is an important feature of the invention, since it was found that without the slot there was some tendency for the fuel to collect in the heel portion of the bowl 164. Periodically, this fuel would break away and be ejected en masse through the nozzle 168. Obviously, an absolutely uniform mixture of air and fuel could not be maintained under these circumstances. However, when the slot 176 was provided, it was found that the flow of air therethrough kept the bowl 164 clean and maintained a uniform fuel mixture at all times.

Another feature of the invention resides in the provision of a hood 178 for the gearing which drives agitators 54 and 56 and agitators 124 and 126. This hood 178 is generally bell-shaped, as perhaps best shown in Fig. 2, and the edge thereof fits downwardly into an annular groove 180 in the disk-shaped support 62. Preferably a suitable seal is provided in groove 180 to effect a tight joint between the hood and the support. A by-pass tube 182 extends from the air inlet pipe 158 to the top of hood 178. The end of tube 182 within pipe 158 is bent horizontally to face the fan 170, and the end thereof within the hood 178 preferably is suitably connected to the inner tubular drive member 130. Thus, a portion of the air traversing pipe 158 enters the by-pass tube 182 which conducts it to the hood 178. Thence, the air flows downwardly over the gearing and through tube 130 into the lower section 20 where it blends with the fuel as it falls downwardly from the valve 80. A valve 184 controls the amount of air by-passed through tube 182 and a suitable gauge 186 registers the air pressure within the tube. Preferably, a filter 188 is provided on the lower end of the inner tubular member 130. Manifestly, the downdraft through the tubular member 130 will prevent any fuel from moving upwardly through the tube and collecting on the drive gearing.

In operation, the twin screws 30 bring the powdered coal over the feeder openings 36 and it will be observed that screws 30 are covered in the area over the openings 36 to keep the weight of the coal from forcing it downwardly therethrough. In this way, better positive control of the coal feed is obtained by the screw feed. In the conical section 16 of the carburetor immediately below openings 36, the coal is mixed with atmospheric air which is drawn into the section by vacuum in the carburetor. Preferably the air is dehumidified and heated before being introduced into the carburetor. The air coming in at this point mixes with the entering coal and keeps it loose and free flowing. Thence the mixture of coal and air flows downwardly past the dome-shaped hood 178 and is deflected by the downwardly convergent annular surface 52 to the valve opening. At this point, the oppositely rotating agitators 54 and 56 together with the associated arms 102 and fins 106 and 110 function to separate and disrupt the coal particles and to assist the natural flow thereof downwardly through the valve. Having the two agitators 54 and 56 rotating in opposite directions prevents the loading up of fuel in any one location and thereby assures an even uniform feed through the carburetor.

A valve 80 may be any suitable diameter depending upon the size of the installation and the amount of coal to be fed. For small domestic units, a valve of from three to five inches in diameter is satisfactory. In general, the valve 80 should have sufficient travel to provide an annular valve opening up to one-quarter of an inch. However, in a valve of the size hereinabove referred to, a valve opening of about one sixty-fourth of an inch is sufficient for normal operating conditions.

Any suitable means may be provided for raising and lowering the valve 80 and it is to be understood that a manual actuator is here shown for purpose of illustration only. It is contemplated that any means for adjusting the valve 80 may be employed and such means may be either manual or automatic in operation.

It will be readily apparent that the pulverized coal is pulled downwardly through the valve opening by the combined action of gravity, vacuum, and the feeder agitators 54 and 56. As the coal is sprayed downwardly through the valve 80 it encounters the two multi-spoke agitators 124 and 126 which "atomize" any lumps formed during passage of the coal through the valve opening, keep the individual particles from clinging together, and insure proper mixing of the coal with air as it is drawn from the carburetor.

As suggested, the air tube 132 conveniently may be attached to the innermost tubular drive member 130 by any suitable connection which permits relative rotation between the parts, and air forced downwardly through the shaft is filtered and sprayed out at the bottom through the agitator hub 138. This arrangement provides a positive means for protecting the lower bearings of the agitator drive mechanism since the downwardly moving air prevents coal dust from coming up to the bearing. Also, this air which is under pressure performs the additional function of mixing with the powdered coal just after it sprays through the annular valve opening.

In addition to the above, air is sucked into the carburetor through the inlet ports 150 and blended with the coal-air mix in the lower portion of the carburetor. The last-mentioned air protects the worm drive which is mounted in chamber 144 and maintains the stiffening rings 140 and 142 substantially free from coal dust.

The powdered coal, having been mixed with small amounts of air three different times, once in the feeder and twice after passing through the valve 80, descends through the carburetor bowl 164 where it turns to flow horizontally outwardly through the nozzle 168. The primary air coming from the fan 170 flows around the bowl 164 and is blended with the fuel discharging through the nozzle 168. This primary air performs the main function of drawing along and mixing with the powdered coal and air coming from the bowl 164. The slot 176 in the rear of the bowl 164 enables a small amount of the primary air to blow in and down whereby to sweep out heavier particles of coal which otherwise might fall on and cling to the bottom of the bowl. At the point where the primary air passes the outlet of the bowl 164, narrow, spiral vanes impart a slight vortex motion to the air and this causes it to blend more thoroughly and evenly with the fuel and air coming from the bowl 164. Upon leaving the bowl 164, the fuel and air are thoroughly blended and flow along like a dry gas toward the nozzle (not shown) which injects the same into the combustion chamber of the furnace (not shown).

That portion of the primary air which flows through the annular space between the outlet pipe 160 and liner 172, in effect, insulates the liner and the fuel charge flowing therethrough from outside atmospheric conditions. Thus, the pipe 160 forms an air jacket around the fuel conveyer liner 172 and prevents the liner from sweating. This arrangement allows the fuel-air mixture to flow freely without danger of the powdered coal settling on or sticking to the liner 172. Also, when the air in the outer tube 60 reaches the nozzle at the distal end of the passage, it prevents the fuel from coking at the nozzle outlet because of the heat from the combustion chamber.

It is to be understood that the form of the invention herewith shown and described is to be taken as a preferred example of the same and that various changes in the size, shape and arrangement of parts may be resorted to without departing from the spirit of the invention or the scope of the appended claims.

Having thus described the invention, I claim:

1. A carburetor for powdered fuel comprising a housing having an upper inlet through which fuel is introduced into the housing and a lower outlet through which fuel is discharged from the housing; a valve having a vertical annular passage located in the housing between said inlet and said outlet and including vertically adjustable means for varying the size of said passage to control the flow of said fuel; a bowl below said valve for collecting said fuel and delivering it to said outlet; agitators mounted in the housing below said valve extending downwardly into said bowl and operative to disburse the fuel as it falls through the valve into the bowl; and means for generating a current of air past said bowl and into said outlet, said last-mentioned means arranged to direct a current of air past the bowl to create an atomizing effect in said bowl whereby to draw fuel therefrom and carry the same through said outlet.

2. The combination as set forth in claim 1 wherein said valve includes an upwardly facing annular shoulder around said passage on which fuel accumulates before entering said passage, and a rotatable element disposed centrally of said passage having radial ploughs arranged to ride on said annular shoulder, said ploughs being rotatable with said element and operative to push fuel from the shoulder into said passage at a substantially uniform rate.

3. The combination as set forth in claim 1 wherein said valve includes an upwardly facing annular shoulder around said passage, an upwardly and outwardly inclined annular surface around said shoulder, and concentrically disposed rotatable elements mounted centrally of said passage, one of said elements having radial fins disposed to ride on said annular shoulder, and the other of said rotatable elements having radially projecting arms arranged to traverse said inclined surface.

4. The combination as set forth in claim 1 wherein said valve comprises an upwardly facing annular shoulder around said passage, an upwardly and outwardly inclined annular surface around said shoulder, coaxial elements mounted to rotate in opposite directions centrally of said passage, one of said elements having radial fins disposed to ride on said annular shoulder and the other of said elements having radial arms arranged to traverse said inclined surface, means including driving gears and a gear housing above said passage for rotating said elements, and a by-pass for conducting a portion of said current of air to the top of said gear housing whereby the air flows downwardly through the housing and prevents fuel from collecting on said gears.

5. The combination as set forth in claim 1 including means for introducing atmospheric air downwardly into the housing above said agitators and below said valve whereby to create a downdraft therein which aerates the fuel as it passes from the valve and carries the same to said outlet.

6. The combination as set forth in claim 1 wherein said agitators comprise concentrically disposed rotatable elements, stiffening rings carried by and rotatable with said elements, and air inlet means having an annular discharge opening above said stiffening rings, whereby air entering the housing through said inlet creates a downdraft around said stiffening rings which prevents fuel from accumulating thereon.

7. The combination as set forth in claim 1 wherein said agitators extend coaxially through said valve and include rotatable elements disposed below the valve, and drive means for said rotatable elements disposed above said valve, said rotatable elements including annular stiffening members and said drive means including gears and a gear housing, means for introducing atmospheric air into the housing above said annular stiffening members, and means for by-passing a portion of said current of air to the top of said gear housing.

8. The combination as set forth in claim 1 wherein said bowl has an inlet through which said agitators extend and a discharge nozzle directed toward said outlet, said bowl having a transverse slot opposite said nozzle, the parts so constructed and arranged that a portion of said current of air enters the bowl through said slot and sweeps the fuel along the bottom of the bowl to carry the fuel through said nozzle and into said outlet.

9. The combination as set forth in claim 1 wherein said bowl is arranged to receive fuel from said agitators and has a discharge nozzle directed toward said outlet, a portion of said bowl opposite said nozzle having a slot through which a portion of said current of air passes, said air adapted to sweep along the bottom of the bowl to prevent fuel from accumulating thereon.

10. The combination as set forth in claim 1 including inner and outer concentrically disposed circumferentially spaced outlet pipes, said outer pipe fastened to the housing around said outlet and said inner pipe arranged to receive fuel from said bowl.

11. The combination as set forth in claim 1 wherein said bowl is arranged to receive fuel from said agitators and is provided with a discharge nozzle, and including inner and outer circumferentially spaced pipe means, said outer pipe attached to the housing around said outlet and said inner pipe means projecting into the housing through said outlet, the projecting portion of said inner pipe extending over and circumferentially spaced from the nozzle of said bowl.

12. The combination as set forth in claim 11 including a plurality of spiral vanes between the nozzle and said inner pipe.

13. A carburetor for powdered fuel comprising a housing having an upper inlet through which fuel is introduced into the housing and a lower outlet through which fuel is discharged from the housing; a valve having a vertical annular passage located in the housing between said inlet and said outlet, an upwardly facing annular shoulder around said passage on which fuel accumulates before entering said passage, a rotatable element disposed centrally of said passage having radial ploughs arranged to ride on said annular shoulder and operative to push fuel from the shoulder into said passage at a substantially uniform rate, and vertically adjustable means for varying the size of said pasage to control flow of fuel therethrough; a fuel-collecting member in the housing below the valve having a top opening disposed to receive fuel from the valve passage and a side opening disposed to deliver fuel into the fuel-discharge outlet of the housing; and an air passage extending from said outlet and containing the fuel-collecting member, the latter being spaced from the wall of the passage so that air traversing the passage in the direction of the outlet flows around said fuel-collecting member and draws fuel from the member into the air stream.

STEPHEN L. FITZPATRICK.

References Cited in the file of this patent

UNITED STATES PATENTS

| Number | Name | Date |
|---|---|---|
| 772,229 | Fairly | Oct. 11, 1904 |
| 1,131,951 | Parsons | Mar. 16, 1915 |
| 1,243,892 | Strong | Oct. 23, 1917 |
| 1,364,533 | Von Porat | Jan. 4, 1921 |
| 1,636,331 | Smith | July 19, 1927 |
| 1,970,405 | Thomas | Aug. 14, 1934 |

FOREIGN PATENTS

| Number | Country | Date |
|---|---|---|
| 316,988 | Germany | June 7, 1916 |
| 85,554 | Austria | Sept. 10, 1921 |